US009927456B2

(12) United States Patent
Genevrier et al.

(10) Patent No.: US 9,927,456 B2
(45) Date of Patent: Mar. 27, 2018

(54) PROBE SYSTEM, MIXED PRIMARY REFERENCE PROBE FOR AN AIRCRAFT, ASSOCIATED AIRCRAFT AND MEASURING METHOD

(71) Applicant: THALES, Courbevoie (FR)

(72) Inventors: Gilles Genevrier, Valence (FR); Bernard Ledain, Valence (FR); Jacques Mandle, Valence (FR); Jean-Pierre Schlotterbeck, Valence (FR)

(73) Assignee: THALES, Courbevoie (FR)

( * ) Notice: Subject to any disclaimer, the term of this patent is extended or adjusted under 35 U.S.C. 154(b) by 471 days.

(21) Appl. No.: 14/608,962

(22) Filed: Jan. 29, 2015

(65) Prior Publication Data

US 2015/0168439 A1 Jun. 18, 2015

Related U.S. Application Data

(63) Continuation of application No. PCT/EP2013/057929, filed on Apr. 16, 2013.

(30) Foreign Application Priority Data

Jul. 31, 2012 (FR) ...................................... 12 02153

(51) Int. Cl.
*G01P 3/36* (2006.01)
*G01P 5/14* (2006.01)
(Continued)

(52) U.S. Cl.
CPC .................. *G01P 5/14* (2013.01); *G01P 5/02* (2013.01); *G01P 5/26* (2013.01); *G01P 21/025* (2013.01);
(Continued)

(58) Field of Classification Search
CPC ...... G01P 5/14; G01P 5/26; G01P 5/02; G01P 21/025; G01S 17/023; G01S 17/58; G01S 17/95; G01S 7/4813
(Continued)

(56) References Cited

U.S. PATENT DOCUMENTS 5,259,234 A * 11/1993 Keller ....................... G01F 1/50
73/1.25
5,585,557 A 12/1996 Loschke et al.
(Continued)

FOREIGN PATENT DOCUMENTS

EP 2453244 A1 5/2012
FR 2725034 A1 3/1996
(Continued)

OTHER PUBLICATIONS

International Search Report dated Jun. 13, 2013 for Intl. Patent App. No. PCT/EP2013/057929.

*Primary Examiner* — Mark Hellner
(74) *Attorney, Agent, or Firm* — Knobbe Martens Olson & Bear LLP (57) ABSTRACT

A probe system, mixed primary reference probe for an aircraft, associated aircraft and measuring method are disclosed. In one aspect, the probe system includes a base designed to be fastened on the cockpit of an aircraft, a plurality of regularly spaced static pressure taps, arranged through the base and designed to be connected to a pressure measurement device. The system includes at least one optical window transparent to laser radiation and inserted into the base.

12 Claims, 3 Drawing Sheets

(51) Int. Cl.
*G01P 5/26* (2006.01)
*G01P 21/02* (2006.01)
*G01S 17/58* (2006.01)
*G01S 17/02* (2006.01)
*G01S 7/481* (2006.01)
*G01P 5/02* (2006.01)
*G01S 17/95* (2006.01)

(52) U.S. Cl.
CPC .......... *G01S 7/4813* (2013.01); *G01S 17/023* (2013.01); *G01S 17/58* (2013.01); *G01S 17/95* (2013.01); *Y02A 90/19* (2018.01)

(58) Field of Classification Search
USPC .......................................................... 356/28
See application file for complete search history.

(56) References Cited

U.S. PATENT DOCUMENTS

| | | | |
|---|---|---|---|
| 6,672,152 B2 * | 1/2004 | Rouse | G01P 5/14 73/170.01 |
| 2003/0009268 A1 * | 1/2003 | Inokuchi | G01S 17/58 701/14 |
| 2003/0115948 A1 * | 6/2003 | Rouse | G01P 5/14 73/170.02 |
| 2011/0141471 A1 * | 6/2011 | Schlotterbeck | G01P 5/16 356/342 |
| 2012/0118075 A1 * | 5/2012 | Golly | G01P 5/14 73/861.42 |
| 2013/0162974 A1 * | 6/2013 | Dakin | G01N 21/53 356/28 |

FOREIGN PATENT DOCUMENTS

FR 2891368 A1 3/2007
FR 2953934 A1 6/2011

* cited by examiner

PROBE SYSTEM, MIXED PRIMARY REFERENCE PROBE FOR AN AIRCRAFT, ASSOCIATED AIRCRAFT AND MEASURING METHOD

CROSS-REFERENCE TO RELATED APPLICATIONS

This application is a continuation of Application No. PCT/EP2013/057929, filed Apr. 16, 2013, which claims the benefit under 35 U.S.C. § 119 of French Application No. 12 02153, filed Jul. 31, 2012, which are herein incorporated by reference in their entirety.

BACKGROUND

Field

The described technology generally relates to a probe system for an aircraft.

Description of the Related Art

In aeronautics, the piloting of an aircraft is based on the knowledge of the primary references thereof. These references comprise, inter alia, its speed relative to the ambient air, its altitude and its angle of attack.

These references are determined using probes situated on the cockpit of the aircraft. These probes may comprise pitot tubes and static pressure probes for measuring the total and static pressure, respectively, as well as angle of attack probes and laser anemometer probes, called "LIDAR" probes, which send and receive laser radiation along one or more axes.

These probes are then connected to means for measuring and computing the corresponding property of the aircraft, such as its altitude, angle of attack, relative airspeed, etc.

The measurements are next grouped together and displayed on a screen of the Electronic Flight Instrument System (EFIS), which is a central information source from which the aircraft is piloted.

The angle of attack probes and pitot tubes assume the form of pallets and tubes protruding from the skin of the aircraft.

As a result, they are exposed to meteorological or mechanical factors that may alter their operation.

These factors, for example, comprise:
plugging of the probe orifices by dust or insects,
lightning strikes,
avian impacts during flight,
mechanical impacts occurring on the ground.

As shown by the databases inventorying aeronautic incidents, these factors are a source of failures for protruding probes. These failures can result in erroneous measurements.

In order to offset these problems, the aeronautic certification rules require having redundant primary reference measurement means on the apparatus.

The commonly used solutions consist of having back-up probes, or combining a redundant probe with a pre-existing probe.

Thus, most aircraft whose cabins are not pressurized have a backup static pressure probe accessible from the flight deck and which can be triggered in case of failure.

Furthermore, multifunctional probes exist for example combining static and total pressure probes with a temperature probe.

However, these solutions are not fully satisfactory.

In fact, most of the existing redundant probes are of the protruding type and consequently have failure risks of the same nature as the probes that they are intended to back up.

Lastly, the combination of a probe with a pre-existing probe may require a new certification of the resulting probe if its geometry is altered.

SUMMARY OF CERTAIN INVENTIVE ASPECTS

One inventive aspect a probe system for an aircraft including a base designed to be fastened on the cockpit of an aircraft and a plurality of regularly spaced static pressure taps, arranged through the base and designed to be connected to means for measuring the pressure.

Another aspect is therefore to obtain an additional primary reference probe for an aircraft that does not involve modifying the skin of the aircraft and does not involve recertifying existing probes.

To that end, another aspect relate to a probe system of the aforementioned type, wherein the system comprises at least one optical window transparent to laser radiation and inserted into the base.

Furthermore, another aspect can comprise one or more of the following features, considered alone or according to any technically possible combination:
 the optical window has an outer face flush with an outer surface of the base;
 the optical window comprises a porthole made from glass transparent to infrared radiation;
 the optical window comprises sealing means comprising a seal inserted between the base and the porthole and the seal is made from a material with a thermal expansion coefficient lower than the thermal expansion coefficient of the material of the base;
 the optical window comprises sealing means comprising an insert secured to the base and in which the porthole is received, the difference between the thermal expansion coefficient of the insert and that of the porthole desirably being below 100%;
 the base defines an orifice for receiving the optical window, the porthole being maintained by mechanical engagement in the receiving orifice;
 it comprises fastening means for fastening the optical window on the base, the fastening means comprising a retaining flange for retaining the optical window on the probe system and members for fastening the retaining flange on the probe system;
 the optical window is integral with the base;
 it is made entirely from a material transparent to laser radiation;
 the porthole has a diameter comprised between 1 and 6 cm.

Another aspect relates to a mixed primary reference probe for an aircraft, of the type comprising:
 at least one probe system as described above,
 an optical head connected to a laser anemometer and arranged across from the optical window of the or each probe system, and
 pressure measuring means connected to static pressure taps.

Another aspect also relates to an aircraft comprising at least one mixed primary reference probe as described above.

Another aspect lastly relates to a method of measuring a plurality of physical properties relative to an aircraft, wherein the method comprises the following steps:
 providing a primary mixed reference probe as described above, on the cockpit of the aircraft,
 sending/receiving laser radiation from the inside of the aircraft to the outside of the aircraft through the optical window via the laser anemometer optical head attached to the or each probe system to measure a speed of the aircraft, measuring a static pressure near the aircraft via the static pressure taps of the or each probe system.

BRIEF DESCRIPTION OF THE DRAWINGS

The described technology will be better understood upon reading the following description, provided solely as an example and done in reference to the appended drawings, in which.

DETAILED DESCRIPTION OF CERTAIN INVENTIVE EMBODIMENTS

Figure 1:
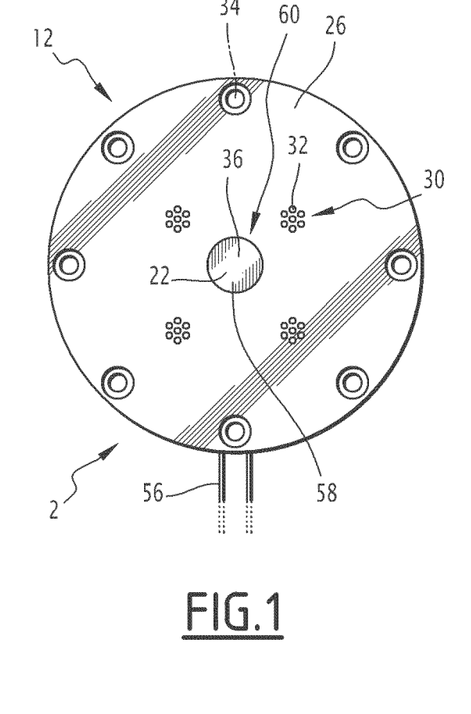
FIG. 1 is a front view of a probe system according to a first embodiment.
Figure 2:
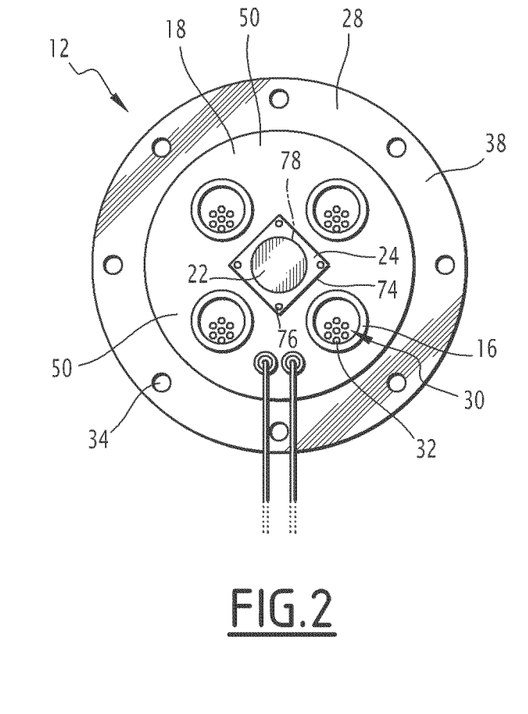
FIG. 2 is a rear view of a probe system according to the first embodiment.
Figures 3, 4:
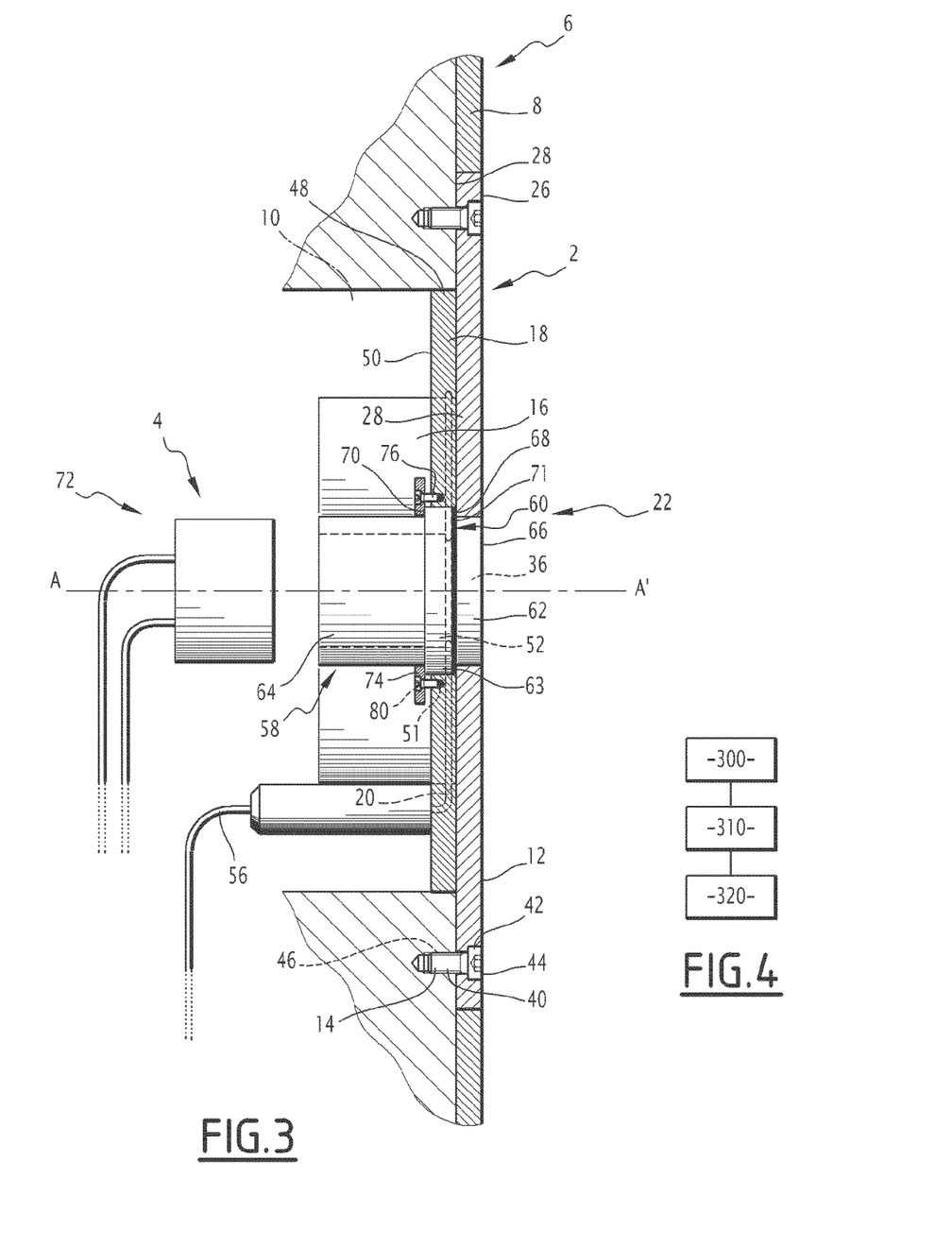
FIG. 3 is a cross-sectional view of a probe system according to the first embodiment positioned on the cockpit of an aircraft.
FIG. 4 is a block diagram of a measuring method using a mixed primary reference probe according to an embodiment.

FIGS. 1, 2 and 3 illustrate a probe system according to a first embodiment.

The probe system 2 according to the first embodiment is able to allow the addition of an optical head 4 connected to a laser anemometer (not shown), or LIDAR (Light Detection and Ranging) probe, to a static pressure probe. To that end, the description of the static pressure probe and pressure measuring means or pressure measurement device to which it is connected is provided in order to facilitate comprehension.

Such a system 2 is designed to be mounted on an aircraft 6. The aircraft 6 comprises a fuselage or cockpit 8 in which a porthole 10 is arranged designed to receive the probe system 2 according to the first embodiment.

As a general rule, aircraft have at least two static pressure probes, situated on either side of a part of the cockpit parallel to the flow.

If the aircraft is a jetliner, these probes are for example positioned on each side of the cockpit, on the parts thereof situated in front of the wings.

This position corresponds to a zone where the flow is disrupted very little by the aircraft. The pressure measurement obtained using these probes thus approaches the pressure value that would be measured without the aircraft, or at least can be corrected easily.

The probe system 2 according to the first embodiment comprises a base 12 and means 14 for fastening the base 12 on the cockpit 8. The probe system 2 also comprises sleeve joints 16, a deicing zone 18 that contains a deicing system 20, an optical window 22, and means or fastener 24 for fastening the optical window 22 on the probe system 2.

The base 12 can be fastened on the cockpit 8 in the porthole 10, which has dimensions complementary to those of the base 12.

The base 12 can have an ovoid or circular general shape.

In the example of FIGS. 1 and 2, the base 12 has a generally circular shape and has a central axis A-A'.

Furthermore, the base 12 is made from a rigid material suitable for the mechanical, thermal and atmospheric stresses encountered during operation of the aircraft 6. The base 12 is made from a metal alloy, for example aluminum, ceramic or any other material certified for aeronautics.

Other alternatives can be considered in which the base 12 is made entirely from a material transparent to laser radiation, as will be seen hereinafter.

The base 12 comprises an outer surface 26 designed to be in contact with the outside atmosphere of the aircraft and an inner surface 28 designed to be placed in the porthole 10 across from the inner space of the aircraft 6.

The base 12 defines groups 30 of static pressure tap orifices 32, receiving orifices 34 for receiving the fastening means 14 and a receiving orifice 36 for the optical window 22 (dotted reference line in FIG. 3).

The outer surface 26 of the base 12 is substantially planar and is able to be flush with the outer surface of the fuselage 8 of the aircraft 6 when the base 12 is fastened on the fuselage 8.

This type of mounting, called "flush" mounting, is well known by those skilled in the art and is able to minimize the disruption of the pressure field and flow that the presence of an object or interface between two objects creates in its vicinity.

As illustrated in FIG. 3, the inner surface 28 is substantially planar and parallel to the outer surface 26 of the base 12.

Furthermore, this inner surface 28 is oriented toward the inside of the aircraft 6.

The static pressure tap orifices 32 are able to allow the atmosphere outside the aircraft 6 to penetrate the probe 2. They are referred to as static ports or static pressure taps. Below, they will be designated using the expression "static pressure taps".

The static pressure taps 32 are arranged in the base 12 and are connected to static pressure measurement means or static pressure measurement device (not shown), as will be seen below. They emerge in the outer surface 26 and the inner surface 28.

The static pressure taps 32 have a generally circular shape and are positioned on the base 12 in the form of groups 30.

In the example FIG. 1, the base 12 thus has four groups 30 of several static pressure taps 32 (7 in the example of FIG. 2) regularly spaced around the central axis A-A'.

The static pressure taps 32 of each group 30 are then positioned so as to occupy the apices of a regular polygon, for example a hexagon, one of the static pressure taps 32 being located at the center of the polygon.

Each group 30 of taps 32 is then comprised in the circle delimited at the polygon that the taps 32 define.

The receiving orifices 34 for the fastening means 14 are arranged through a peripheral flange 38 delimited at the periphery of the base 12.

They are able to minimize the portion of the fastening means 14 protruding outside the base 12.

To that end, each receiving orifice 34 has a shape substantially complementary to the shape of the fastening means 14, as will be seen below.

These receiving orifices 34 are situated on the periphery of the base 12 and are desirably regularly angularly spaced around the central axis A-A'.

In the example of FIG. 1, the base 12 thus has eight receiving orifices 34 for the fastening means 14.

The receiving orifice 36 of the optical window 22 has a shape complementary to that of the optical window 22.

The receiving orifice 36 is arranged through the base 12 and emerges in the outer surface 26 and the inner surface 28.

In the example illustrated in FIG. 3, the receiving orifice 36 has a generally cylindrical shape with central axis A-A'.

Furthermore, the receiving orifice 36 of the optical window 22 is situated on the base 12 in a location able to minimize the pressure and flow disruptions caused by the presence of the optical window 22, as will be seen below.

In the example of FIGS. 1 and 3, the receiving orifice 36 is positioned at the center of the base 12.

The fastening means 14 comprise a head designed to be completely received in one of the corresponding receiving orifices using a flush mount, i.e., such that said head is flush with the outer surface of the base.

In the example of FIG. 1, these fastening means 14 for example comprise screws 40 with a flat head 42. The head 42 of each screw 40 has a general shape suitable for cooperating with each receiving orifice 34 and also has a planar surface 44 designed to be flush with the outer surface 26.

The screws 40 are then designed to be engaged with sleeve joints 46 (dotted reference line in FIG. 3) arranged in the cockpit 8.

The sleeve joints 16 are designed to be mounted hermetically on the so-called "static pressure" channel (not shown) connected to means for measuring the pressure (not shown) to which the atmospheric pressure that penetrates the probe 2 via the static pressure taps 32 is transmitted.

To that end, each sleeve 16 has a generally cylindrical shape with a respective axis substantially parallel to the central axis A-A'. Each sleeve 16 is placed around a group 30 of static pressure taps 32.

Each sleeve 16 has a diameter larger than the diameter of the circles respectively defined at each of the groups 30 of static pressure taps 32.

Each sleeve 16 is fastened on the inner surface 28 of the base 12 across from a group of static pressure taps 32, that group 30 of static pressure taps 32 emerging in the sleeve 16.

The static line connected to said sleeve 16 thus undergoes an atmosphere having substantially the pressure prevailing outside the aircraft 6.

The static pressure channel has a tubular shape. It for example assumes the form of a rigid or flexible tube connected to pressure measurement means. The tube is for example metallic.

These pressure measuring means for example comprise a module (not shown) for measuring flight data positioned near the probe 2. The Air Data Module (ADM) converts the pressure information provided by the probe 2 into digital information. This digital information is next sent, for example via a communication bus, to an air data computer for computing flight data or an inertial and air data reference unit.

These units and computers equipped on aircraft are generally provided with electric flight commands and serve to centralize the flight data generated by the different probes comprised by the aircraft.

The centralized information is next, for example, displayed via the EFIS of the aircraft to the pilots and/or copilots, for whom it serves as a support in piloting the aircraft. The centralized information is also sent to many pieces of equipment of the airplane.

The deicing zone 18 is able to receive the deicing system 20 of the probe system 2. It further receives the optical window 22 and is passed through by the sleeve joints 16.

The deicing zone 18 has a generally cylindrical shape with axis A-A' and a diameter smaller than the diameter of the base 12. It is made from a material similar to the material of the base 12.

Furthermore, the deicing zone 18 is fastened on the inner surface 28 of the base 12.

In the example of FIGS. 2 and 3, it is for example welded on the inner surface 28.

The deicing zone 18 is longitudinally delimited opposite the base 12 by a wall 50 in which passage apertures 51 are arranged (dotted reference line in FIG. 3) for the fastening means 24 of the optical window 22.

These passage apertures 51 are suitable for receiving the fastening means 24 in a complementary manner.

In the example of FIG. 2, the fastening means 24 comprise grooves designed to be mounted in a thread positioned in the corresponding passage aperture 51.

The deicing zone 18 also comprises a housing 52 (dotted reference line in FIG. 3) for insertion of the optical window 22. The passage apertures 51 are regularly arranged around the housing 52.

The housing 52 of the optical window 22 is a through housing. It is further situated across from the optical window 22 receiving orifice 36 arranged on the base 12.

In the example of FIG. 3, the housing 52 has a generally cylindrical shape with dimensions larger than the dimensions of the receiving orifice 36 of the optical window 22 on the base 12 and is designed to receive an intermediate part supported by the optical window 22, as will be seen below.

The height of the deicing zone 18 along the central axis A-A' is substantially equal to the thickness of the base 12.

Lastly, and as illustrated in FIG. 3, the supply means 56 of the deicing system 20 emerge on the wall 50.

The deicing system 20 of the probe system 2 is able to clear the static pressure taps 32 when they are obstructed by ice or frost.

To that end, it comprises electrical resistances or one or more resistive wires connected to the supply means 56 and embedded in the material of the deicing zone 18.

In the example of FIGS. 1 to 3, the deicing system 20 comprises a plurality of resistive wires wound around portions of the sleeve joints 16 situated in the deicing zone 18.

When electricity is supplied to the deicing system 20, the wires heat the deicing zone 18 around the static pressure taps 32 in order to melt the ice or frost obstructing them.

The optical window 22 is able to allow the passage of the laser radiation used by a LIDAR probe to take a speed measurement while minimizing the disruptions of the pressure and flow field that its presence causes.

The exact position of the optical window 22 on the base 12 is computed, then tested to minimize the disruptions of the pressure field and the flow.

Consequently, in reference to FIGS. 1 to 3, the optical window 22 is shown at the center of the base 12, but may be positioned thereon in a more suitable location defined through those computations and tests.

The optical window 22 comprises a porthole 58 transparent to laser radiation and sealing means 60.

The porthole 58 is made using an optical material suitable for laser radiation with a wavelength substantially equal to about 1550 nm. It is received through the base 12.

In the probe system 2 according to the first embodiment, the porthole 58 is desirably made from glass transparent to infrared radiation, for example such as radiation with a wavelength substantially equal to about 1550 nm.

When it is mounted on the base 12, the porthole 58 is flush with the outer surface 26 of the base 12.

As illustrated by FIG. 3, the porthole 58 comprises a cylindrical outer part 62, an annular intermediate part 63 surrounding the outer part 62, and an inner part 64 that is also cylindrical that is positioned in the porthole 10 for receiving the base 12 on the cockpit 8.

The outer 62, intermediate 63 and inner 64 parts are integral. They are coaxial with the central axis A-A' and cylindrical.

The outer part 62 is received through the receiving orifice 36. It has a planar face 66 that is flush with the outer surface 26 of the base 12 and found in contact with the outer atmosphere of the aircraft 6.

Indeed, when the aircraft 6 is in flight, the planar face 66 is subject to a pressure lower than the pressure to which the inner part 64 of the porthole 58 is subjected.

This pressure difference creates a force applied on the porthole 58 that tends to keep the outer part 62 engaged in the receiving orifices 36, 52 of the optical window 22.

The intermediate part 63 has a diameter larger than that of the outer part 62 and the inner part 64.

The intermediate part 63 has a front face 68 turned toward the base 12 and a rear face 70 turned toward the inside of the aircraft 6. The front face 68 and the rear face 70 are both positioned radially.

The intermediate part 63 is received in the housing 52. Its front face 68 bears on the inner surface 28 of the base 12. The fastening means 24 grip the intermediate part 63 against the base 12.

When the aircraft 6 is in flight, the pressure difference tends to press the intermediate part 63 against the inner surface 28 of the base 12.

The sealing means 60 are able to ensure sealing of the optical window 22 and offset the relative thermal expansion of the porthole 58 and the base 12.

To that end, the sealing means 60 comprise an annular seal 71 positioned around the outer part 62 of the porthole 58. The seal 71 is positioned axially between the intermediate part 63 and the base 12.

When the optical window 22 is positioned on the base 12, the intermediate part 63 bears on the inner surface 28 of the base 12 by means of the seal 71. It thus isolates the orifice 36 from the inside of the aircraft 6.

The seal 71 is made so as to have a thermal expansion coefficient lower than that of the material of the base 12.

The seal 71 comprises an INVAR ring, which is an alloy of iron and nickel with a low thermal expansion coefficient also known under the name Fe—Ni36%. The ring is coated with a hard rubber sheath also having a low thermal expansion coefficient.

The thickness of the INVAR ring is then determined as a function of the desired allowance for unevenness of the probe system 2, the thickness of the base 12, its thermal expansion coefficient and the thermal expansion coefficient of the porthole 58.

Alternatively, the seal 71 comprises a stack of three coaxial rings with the same diameter, the central ring of which is made from INVAR and the other two rings of which are made from rubber.

Due to the presence of the seal 71, when the base 12 expands and the receiving orifice 36 and housing 52 deform, the porthole 58 moves little along the central axis A-A' in the receiving orifice 36. The alignment of the planar face 66 of the porthole 58 and the outer surface 26 of the base 12 is then preserved. Thus, the flush nature of the mounting of the optical window 22 on the base 12 and the sealing of the optical window 22 are preserved.

The optical window 22 of the probe system according to the first embodiment is placed across from an optical head 4 for receiving and transmitting, connected to a laser anemometer to provide an additional primary mixed reference probe 72 of the aircraft 6.

Alternatively, the optical window 22 is integrated into the optical head 4.

Such anemometers are for example described in documents FR 2,953,934 and FR 2,725,034.

These probes, for example designated using the acronym LIDAR, are commonly used in aeronautics and are based on sending one or more light beams along one or more measuring axes. The radiation is focused by the probe in a volume of air separated from the aircraft—reference is made to far field measurement, unlike pitot tubes or static pressure probes, which take near field measurements. The remote volume of air is for example located at a distance greater than that of the outer surface. The particles suspended in the volume of air in which the measurement is done diffuse part of the radiation toward the optical head of the LIDAR probe.

The properties of the diffuse radiation are then used for the LIDAR probe to provide—via an interferometry device, for example—a measurement of the relative speed of the aircraft along the measurement axis or axes.

The anemometric probe comprises a device for generating laser radiation. The radiation is next amplified, then relayed to an optical head positioned across from the window.

The radiation generated by the LIDAR probe is thus emitted by the optical head and diffused toward the latter through the window.

In the probe system according to the first embodiment, the optical head 4 of a LIDAR probe is fastened across from the optical window 22 arranged on the base 12 via fastening means (not shown) of the optical head 4.

The optical window 22 positioned on the base 12 allows the transmission and reception, through the static pressure probe, of the beams used by the LIDAR probe to which the optical head 4 is connected.

Furthermore, the dimensions of the optical window 22 are adapted to the optical head 4 attached to the probe system according to the first embodiment.

Preferably, the diameter of the porthole 58 of the optical window 22 is comprised between about 1 cm and about 6 cm.

The probe system according to the first embodiment allows the addition of a LIDAR transmission/reception optical head 4 to a static probe without modifying the geometry thereof, and consequently without requiring new certification of the pressure probe thus modified.

The probe system according to the first embodiment thus makes it possible to benefit from an additional mixed primary reference probe 72 without altering the skin of the aircraft 6.

Furthermore, a probe system according to the first embodiment can then be mounted on the aircraft 6 when the latter is already in use, by replacing a traditional static pressure probe that it comprises.

Furthermore, the LIDAR probes are situated under the skin of the aircraft 6, and they are thus not subject to the failures to which protruding probes are exposed, and therefore have an improved uptime.

The fastening means 24 for the optical window 22 comprises a flange 74 for retaining the optical window 22 and screws 76 for fastening the retaining flange 74 on the wall 50.

The retaining flange 74 is substantially planar and for example has a generally polygonal shape, such as square.

It delimits a receiving opening 78 for the optical window 22 and passage apertures 80 (dotted reference line in FIG. 3) for fastening screws 76.

As illustrated in FIG. 2, the receiving opening 78 receives the inner part 64 of the porthole 58.

The passage apertures 80 for fastening screws 76 are positioned at the corners of the retaining flange 74. They are placed across from the passage apertures 51 arranged on the wall 50.

The flange 74 is in contact with the rear face 70 of the intermediate part 63 of the porthole. When the fastening screws 76 are engaged in the passage apertures 51, the retaining flange 74 keeps the optical window 22 in the receiving orifice 36 and in the housing 52 by cooperation with the rear face 70 of the intermediate part 63 of the porthole 58 and with the wall 50. It should be noted that inasmuch as the flange 74 is not in contact with the wall 50, it is desirable to insert an elastic washer or an elastic spring into each of the passage apertures 80 seeking to prevent deformation of the flange 74 during fastening thereof.

In reference to FIG. 4, the method for implementing a measurement via the mixed primary reference probe 72 according to an embodiment will now be described.

First, during a step 300, a laser anemometer optical head 4 is added to a probe system 2 by arranging it across from the optical window 22 of the probe system 2.

Next, as described above, a measurement of the static pressure around the aircraft 6 is done via the static pressure taps 32 arranged on the base 12 during a step 310.

At the same time or later, during step 320, a measurement of a relative speed of the aircraft 6 on the cockpit 8 of which the probe system 2 is fastened is done via laser radiation emitted by the optical head 4 from the inside of the cockpit 8 through the porthole 58 of the optical window 22, reflected toward the optical window 22, then detected by said head 4 through said optical window 22.

In a first alternative embodiment (not shown) of the probe system, the base 12 does not comprise a deicing system 20 and deicing zone 18.

This alternative embodiment is desirably used when the probe system 2 is fastened in a location of the cockpit 8 of an aircraft 6 such that the risks of icing of the probe 2 are decreased.

The retaining flange 74 of the optical window 22 is then fastened on the inner surface 28 of the base 12 and keeps the optical window 22 in its receiving orifice 36 on the base 12 by cooperation with the inner surface 28 of the base 12 and the rear face 70 of the intermediate part 63 of the porthole 58.

The passage apertures 80 for fastening screws 76 of the retaining flange 74 are then arranged in the inner surface 28 of the base 12.

In a second alternative embodiment (not shown) of the probe system, the base 12 is entirely made from a material transparent to the laser radiation used by the LIDAR probe connected to the window 22.

The porthole 58 of the optical window 22 is integral with the base 12 and for example has a cylindrical shape with a height equal to the thickness of the base 12.

The outer face 66 of the porthole 58 designed to be in contact with the outside atmosphere of the aircraft 6 then has a specific surface treatment, for example a polish compatible with the wavelength substantially equal to 1550 nm of the radiation used by the LIDAR probe attached to the optical window 22.

The optical window 22 thus has the particularity of not requiring sealing means 60 and, being integral with the base 12, not having an interface therewith.

The presence of the optical window therefore does not create any disruption of the adjacent pressure field, which makes the position of the optical window on the base 12 that much more flexible.

Similarly to the previous alternative embodiment, this alternative embodiment is desirably used when the probe system 2 does not need to be deiced.

Figure 5:
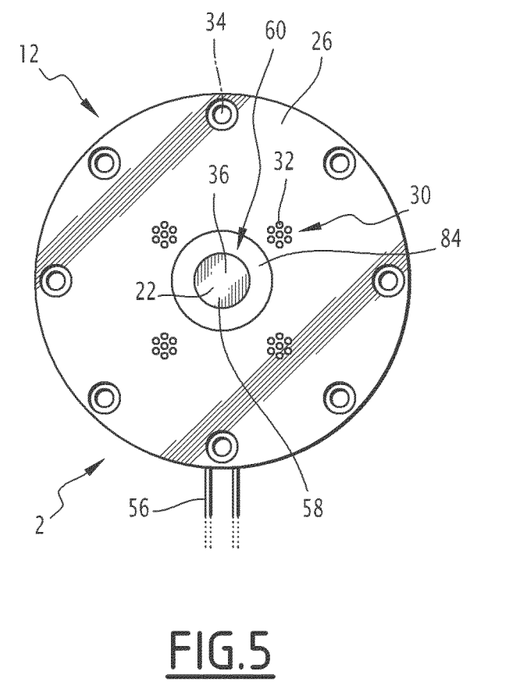
FIG. 5 is a view similar to the view of FIG. 1 of a probe system according to a third embodiment.

In reference to FIG. 5, in a third alternative embodiment, aside from the seal 71, the sealing means 60 also comprise a generally annular insert 84.

The seal 71 is then made from a tight material well known by those skilled in the art, such as a hard rubber composite, and does not have to have a thermal expansion coefficient lower than that of the material of the base 12.

The insert 84 has a thickness substantially equal to the thickness of the base 12 and is received in the receiving orifice 36. The insert is secured to the base 12, for example by welding and/or forcible fitting.

The insert 84 has a cylindrical central orifice with dimensions complementary to those of the outer part 62 of the porthole 58. The outer part 62 of the porthole 58 is received in the central orifice of the insert 84. The seal 71 is situated in the housing 52 and in contact with the rear of the insert 84.

In this example, the insert is made from an alloy of Iron, Nickel and Cobalt with a thermal expansion coefficient close to that of the material of the porthole 58. The alloy is for example KOVAR.

More specifically, the difference between the thermal expansion coefficient of the insert 84 and that of the porthole 58 is desirably less than 100%.

Thus, when the material of the base 12 expands, the insert 84 prevents the porthole 58 from moving along the central axis A-A', and the flush nature of the mounting of the optical window 22 on the base 12 is preserved.

In a fourth alternative embodiment (not shown), the base 12 is entirely made from an alloy of Iron, Nickel and Cobalt with a thermal expansion coefficient close to that of the material of the porthole 58. The alloy is for example KOVAR.

As a result, the porthole 56 does not move along the central axis A-A' during the expansion of the material of the base, such that the flush nature of the mounting of the optical window 22 on the base 12 is preserved.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A probe system, comprising:
    a base configured to be fastened on the cockpit of an aircraft;
    a plurality of regularly spaced static pressure taps arranged through the base and configured to be connected to a pressure measurement device;
    at least one optical window transparent to laser radiation and inserted into the base; and
    a fastener configured to fasten the optical window on the base, wherein the fastener comprises a retaining flange for retaining the optical window on the probe system and members for fastening the retaining flange on the probe system.

2. The system according to claim 1, wherein the optical window has an outer face flush with an outer surface of the base.

3. The system according to claim 1, wherein the optical window comprises a porthole formed of glass transparent to infrared radiation.

4. The system according to claim 3, wherein the optical window comprises a seal inserted between the base and the porthole, and wherein the seal is formed of a material with a thermal expansion coefficient lower than the thermal expansion coefficient of the material of the base.

5. The system according to claim 3, wherein the optical window comprises an insert secured to the base and in which the porthole is received, and wherein the difference between the thermal expansion coefficient of the insert and that of the porthole below 100%.

6. The system according to claim 3, wherein the base defines an orifice configured to receive the optical window, and wherein the porthole is maintained by mechanical engagement in the receiving orifice.

7. The system according to claim 1, wherein the optical window is integral with the base.

8. The system according to claim 7, wherein the base is formed entirely from a material transparent to laser radiation.

9. The system according to claim 3, wherein the porthole has a diameter between about 1 cm and about 6 cm.

10. A mixed primary reference probe for an aircraft, comprising:
   at least one probe system comprising at least one optical window;
   an optical head connected to a laser anemometer and arranged across from the optical window of the probe system; and
   a pressure measuring device,
   wherein the probe system further comprises:
      a base configured to be fastened on the cockpit of the aircraft; and
      a plurality of regularly spaced static pressure taps arranged through the base and connected to the pressure measurement device; and
      a fastener configured to fasten the optical window on the base,
      wherein the fastener comprises a retaining flange for retaining the optical window on the probe system and members for fastening the retaining flange on the probe system, and
      wherein the optical window is transparent to laser radiation and inserted into the base.

11. An aircraft, comprising:
   at least one mixed primary reference probe, the mixed primary reference probe comprising:
      at least one probe system comprising at least one optical window;
      an optical head connected to a laser anemometer and arranged across from the optical window of the probe system; and
      a pressure measuring device,
      wherein the probe system further comprises:
         a base configured to be fastened on the cockpit of the aircraft;
         a plurality of regularly spaced static pressure taps arranged through the base and connected to the pressure measurement device; and
         a fastener configured to fasten the optical window on the base,
         wherein the fastener comprises a retaining flange for retaining the optical window on the probe system and members for fastening the retaining flange on the probe system, and
         wherein the optical window is transparent to laser radiation and inserted into the base.

12. A method of measuring a plurality of physical properties relative to an aircraft, the method comprising:
   providing a primary mixed reference probe on the cockpit of the aircraft, wherein the mixed primary reference probe comprises: i) at least one probe system comprising at least one optical window, ii) an optical head connected to a laser anemometer and arranged across from the optical window of the probe system, and iii) a pressure measuring device, wherein the pressure measuring device comprises: i) a base configured to be fastened on the cockpit of the aircraft, ii) a plurality of regularly spaced static pressure taps arranged through the base and connected to the pressure measurement device, and iii) a fastener configured to fasten the optical window on the base, wherein the fastener comprises a retaining flange for retaining the optical window on the probe system and members for fastening the retaining flange on the probe system, and wherein the optical window is transparent to laser radiation and inserted into the base,
   sending/receiving laser radiation from the inside of the aircraft to the outside of the aircraft through the optical window via the laser anemometer optical head attached to the probe system to measure a speed of the aircraft, and
   measuring a static pressure near the aircraft via the static pressure taps of the or each probe system.

* * * * *